United States Patent Office 3,278,558
Patented Oct. 11, 1966

3,278,558
PROCESS FOR THE PRODUCTION OF
CYCLIC ESTERS
Paul N. Rylander, Newark, N.J., and Lewis M. Berkowitz, Baltimore, Md., assignors to Engelhard Industries, Inc., Newark, N.J., a corporation of Delaware
No Drawing. Filed June 11, 1965, Ser. No. 463,332
5 Claims. (Cl. 260—343.5)

This is a continuation-in-part application of our copending application Serial No. 150,867, filed November 8, 1961, now abandoned, which in turn was a continuation-in-part of our copending application Serial No. 713,559, filed February 6, 1958, now abandoned.

This invention relates to the production of cyclic esters and more especially to a new and improved oxidation process for preparing lactones wherein ruthenium tetroxide is the oxidant, and characterized by being carried out in a non-violent and controllable manner.

Use of ruthenium tetroxide for oxidizing various organic compounds, for instance aldehydes, acetylenes, amides, and hydroxy compounds, is known in the prior art. However, such oxidation with ruthenium tetroxide has heretofore been unsatisfactory for the reason the oxidation has generally been a violent, explosive, non-controllable reaction, with complete or virtually complete degradation or destruction of the organic compound being oxidized whereby the desired oxidation products were not obtained.

In accordance with the present invention, a process is provided for oxidizing cyclic ethers employing ruthenium tetroxide as oxidant in a non-violent, readily controlled manner to obtain cyclic esters or lactones. The process involves oxidizing the cyclic ether of the formula

wherein Alk is an unsubstituted or substituted methylene radical and $n$ is an integer of 2–20 inclusive in solution in an inert or substantially inert liquid solvent at a temperature maintained in the range of 0° C. to 20° C. inclusive. The lactone obtained as product of such process has the formula

wherein Alk and $n$ have the meaning previously disclosed herein.

Exemplary of the inert or substantially inert liquid solvents for use in the process are carbon tetrachloride, chloroform, paraffinic hydrocarbons, e.g. hexane, heptane, 2-methyloctane and 3-methyloctane, naphthenes, e.g. cyclopentane, cyclohexane, methylcyclopentane and methylcyclohexane, acetone, ethyl acetate, butyrolactone and water.

Exemplary of ethers oxidized in accordance with the invention are tetrahydrofuran, 2-methyltetrahydrofuran, 3-methyltetrahydrofuran, 2,3-diethyltetrahydrofuran, 2,3-dimethyltetrahydrofuran, 3-hexyltetrahydrofuran, tetrahydropyran, 2 - methyltetrahydropyran, 3-ethyltetrahydropyran, 4 - butyltetrahydropyran, 2,3-diethyltetrahydropyran, and 2,3,4-trimethyltetrahydropyran. Product lactones obtained by the oxidation of these cyclic ethers are, respectively, γ-butyrolactone; γ-methyl-γ-butyrolactone; a mixture of α-methyl-γ-butyrolactone and β-methyl-γ-butyrolactone; β,γ-diethyl-γ-butyrolactone; β,γ-dimethyl-γ-butyrolactone; a mixture of α-hexyl-γ-butyrolactone and β-hexyl-γ-butyrolactone; Δ-valerolactone; Δ-methyl-Δ-valerolactone; a mixture of α-ethyl-Δ-valerolactone and γ-ethyl-Δ-valerolactone; β-butyl-Δ-valerolactone; γ,Δ-diethyl-Δ-valerolactone; β,γ,Δ-trimethyl-Δ-valerolactone.

The cyclic ethers herein react with the RuO₄ as follows:

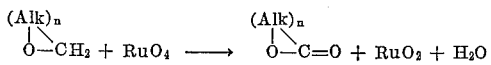

with Alk and $n$ having the significance previously specified.

The reaction temperature of 0° to 20° C. are essential to the success of the present invention for the reason that at temperatures much above 20° C. the violent and uncontrollable reactions occur even in the presence of the inert solvent. At temperatures much below 0° C. the reaction takes place too slowly to be commercially practicable, typically requiring reaction times of 1 week or longer. Temperatures of 0° to 10° C. are preferred for the reason that by observing the 10° C. upper limit, excessive oxidation is minimized. Preferred solvents for forming this solution of the ether prior to the oxidizing are carbon tetrachloride, chloroform, the paraffinic hydrocarbons and naphthenes, inasmuch as the ruthenium tetroxide tends to undergo a slow reaction with the remaining solvents which are oxygenated compounds.

Tetrahydrofuran was smoothly oxidized herein to gamma-butyrolactone in nearly quantitative yield. Whatever activating effect the oxygen of the ether linkage exerts on the adjacent methylene group is absent in the ester. The gamma-butyrolactone was stable toward further oxidation and attempts to carry the oxidation thereof to succinic anhydride were unsuccessful.

The ruthenium tetroxide may be present in an amount stoichiometrically equivalent to the cyclic ether to be oxidized or in slight excess over this amount.

The pressure is preferably atmospheric, as superatmospheric or subatmospheric pressures afford no particular advantages although these pressures may be employed. The reaction time may be in the range of a few seconds to one hour, usually a few seconds to a few minutes.

The invention will be further illustrated by reference to the following specific examples:

EXAMPLE I

*Preparation of ruthenium tetroxide*

A solution of 4.37 grams of ruthenium trichloride, containing 18 percent water, in 80 ml. of 0.5 N hydrochloric acid was placed in a 200 ml. round-bottom flask and heated to boiling temperature. A 1 N sodium bromate solution was added gradually to the reaction mixture through a thistle tube, provided with a stopcock. The tube passed down through a short air condenser which was connected at the top by a side arm to an ice cooled trap. Glass connections were used throughout. Ruthenium tetroxide volatilized as it was formed and was collected in the cooled trap. Sodium bromate was added in portions until further addition failed to generate more ruthenium tetroxide. The supernatant water was removed by a capillary dropper and the residue of ruthenium tetroxide, weighing 1.5 grams, was dissolved in 10 ml. of carbon tetrachloride, to produce a deep red solution. The yield of ruthenium tetroxide in a number of such preparations averaged 55 percent.

EXAMPLE II

A ruthenium tetroxide solution, prepared according to the procedure of Example I and containing 1.51 grams of ruthenium tetroxide on a solvent-free basis, was added dropwise with stirring to a solution of 1.5 grams of tetrahydrofuran in 10 ml. of carbon tetrachloride, cooled in an ice bath to maintain a temperature of 10 to 15° C. The oxidation proceeded in a non-violent and easily controllable manner to produce γ-butyrolactone, identified by infrared spectrogram. The melting point of the derivative, phenylhydrazide, obtained therefrom was 88–89° C.

EXAMPLE III

A solution is made up of tetrahydropyran in carbon tetrachloride. To this solution is added dropwise a solution of ruthenium tetroxide prepared according to the procedure of Example I and containing 1.51 grams of ruthenium tetroxide (solvent-free basis). The solution of tetrahydropyran is maintained at a temperature of 15° C. to 20° C. by cooling in an ice bath during the addition of the ruthenium tetroxide solution. The oxidation reaction proceeds in a non-violent and non-explosive manner and is easily controlled to produce δ-valerolactone.

What is claimed is
1. A process for the preparation of a lactone of the formula

wherein Alk is from the group consisting of unsubstituted and substituted methylene radicals and $n$ is in integer of 3 to 4 inclusive, which comprises oxidizing a cyclic ether of the formula

wherein Alk and $n$ are as aforesaid with ruthenium tetroxide in solution in a substantially inert liquid solvent at a temperature maintained in the range of 0° C. to 20° C. inclusive thereby effecting the oxidation in a non-violent and controllable manner.

2. A process in accordance with claim 1 wherein the solvent is carbon tetrachloride.

3. A process in accordance with claim 1 wherein the solvent is water.

4. A process in accordance with claim 1 wherein the cyclic ether is tetrahydrofuran and the product lactone is γ-butyrolactone.

5. A process in accordance with claim 1 wherein the cyclic ether is tetrahydropyran and the product lactone is δ-valerolactone.

References Cited by the Examiner
UNITED STATES PATENTS 2,020,298 11/1935 Carother et al. _____ 260—343
2,453,890 11/1948 Bremmer et al. ____ 260—343.5

FOREIGN PATENTS 610,166 10/1948 Great Britain.
900,107 7/1962 Great Britain.

WALTER A. MODANCE, *Primary Examiner.*

JAMES A. PATTEN, *Assistant Examiner.*